Figure 3:
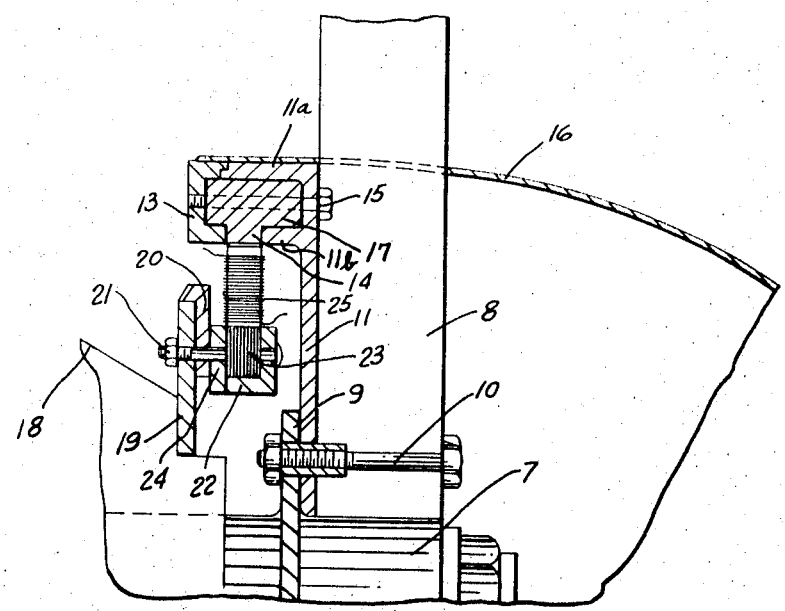

Oct. 1, 1968 K. L. REPKE 3,404,326
CHARGING RATE VARIED BY ARMATURE CONTROL
Filed Oct. 22, 1965 4 Sheets-Sheet 1
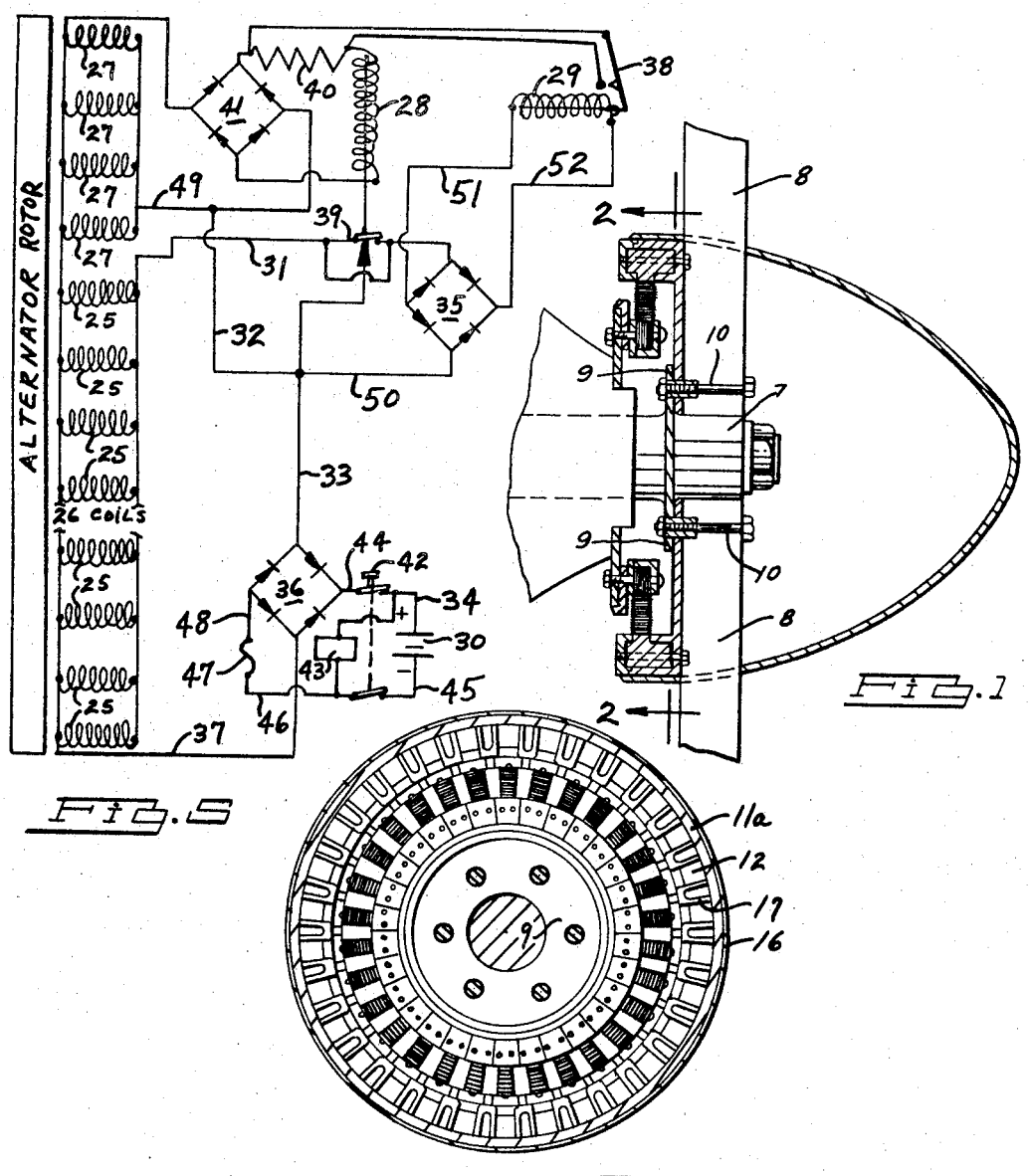
INVENTOR.
KENNETH LESTER REPKE
BY
Donnelly, Mentag & Harrington
ATTORNEYS Oct. 1, 1968　　　　　　　　K. L. REPKE　　　　　　　3,404,326
CHARGING RATE VARIED BY ARMATURE CONTROL
Filed Oct. 22, 1965　　　　　　　　　　　　　　4 Sheets-Sheet 2

INVENTOR.
KENNETH LESTER REPKE
BY
Donnelly, Mentag & Harrington
ATTORNEYS

INVENTOR.
KENNETH LESTER REPKE
BY
Donnelly, Mentag & Harrington
ATTORNEYS

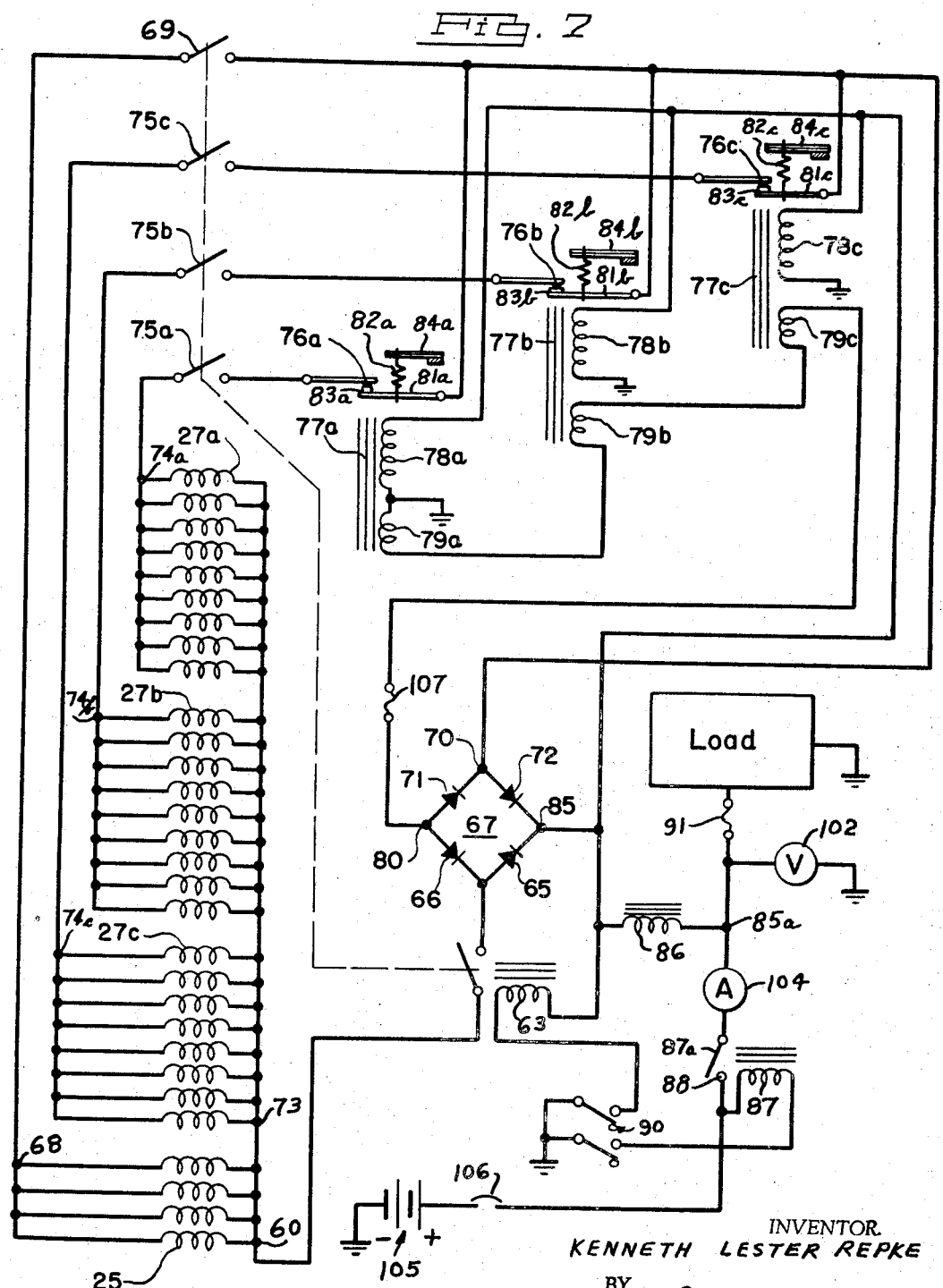

United States Patent Office 3,404,326
Patented Oct. 1, 1968

3,404,326
CHARGING RATE VARIED BY
ARMATURE CONTROL
Kenneth Lester Repke, 7788 Auburn,
Detroit, Mich. 48228
Continuation-in-part of application Ser. No. 183,943,
Mar. 30, 1962. This application Oct. 22, 1965, Ser.
No. 502,122
6 Claims. (Cl. 320—23)

This is a continuation-in-part of my copending application for Permanent Magnet Alternator, Ser. No. 183,943 filed Mar. 30, 1962.

My invention relates generally to electrical power supply and regulation. In particular, this invention relates to an alternator supply of electrical current to the electric components of an airplane. My invention further relates to a new and useful improvement in a permanent magnet alternator to be mounted on the forward end of the engine crankcase of light aircraft engines to supply the electrical energy necessary for communication and navigation equipment, lights and power.

In electrical power supply and regulation systems of aircraft, in the interest of saving weight, it has been found desirable to rely on a relatively small battery. In particular, it has been found desirable to draw as little current as possible from the battery and to rely as much as possible for electrical energy on means generating electrical current from the rotating shaft of the engine supplying motive power to the aircraft. In applying this concept, it has been found necessary to regulate the current supplied by engine rotation not only in conformity with the current demands of the electrical systems of the aircraft, but also in conformity with the capacity of the battery for non-destructive charging and discharging.

In a typical operation of an aircraft, where an electric starter is used, all of the initial electrical energy necessary for starting the engine is supplied by the battery. In this instance, as soon as the means for generating electric current from the motive power of the engine is operable, its entire output is required to recharge the battery due to the relatively heavy drain of the starting motor. Once the engine is started and the battery recharged, the component that requires constant supply of electrical energy of a significant value is the radio receiver. In terms of relative values, it is typical for the battery in an aircraft to have a normal voltage of 12 volts and a 33 ampere-hour rate. The starting motor can drain as much as 10 amperes. The radio receiver can require from 4 to 10 amperes. The means generating electrical current from the motive power of the engine does so at a typical voltage of 12½ volts at 1000 r.p.m.. and has a generating capacity at those values up to 33 amperes.

During flight, should other electrical components of the electrical system of the aircraft be utilized, for example, an automatic pilot, current demands in addition to the radio receiver will be imposed upon the system.

It is desirable to have such demands met by current supply from that generated by the motive power of the engine of the aircraft rather than the battery. Such additional demands may be in several ampere increments up to 30 amperes in a typical aircraft. It can be readily seen that to meet such a demand by the battery would cause a severe drain on the battery. On the other hand, to have all of the current supplied by the motive force of the engine applied continuously to the system, whether that current output was required or not, would overcharge the battery to a destructive extent. It has also been observed that to apply current to the system from that supplied by the motive power of the engine in very small increments would have the disadvantage of requiring a large number of switching members that would substantially increase the cost and weight of an electrical power supply and regulation system in an aircraft.

In view of the foregoing, it is an object of this invention to provide an electrical supply and regulation system incorporating a permanent magnet alternator which is simple in construction, economical of manufacture, durable, compact, and highly efficient in use.

Another object of this invention is the provision of a permanent magnet alternator which is productive for maximum usage, capable of being mounted in a minimum amount of space, and which has no wearing parts and therefore needs no lubrication for upkeep.

A further object of this invention is the provision of an alternator of this class which is adapted to make maximum use of the power input and which has no bearings, gears or belts to absorb and waste power.

Still another object of this invention is the provision of an alternator of this class which is contained in the engine cowling and, therefore, creates no additional drag.

Another object of the invention is the provision of an alternator of this class having double usage for night flying.

Another object of the invention is the provision of an alternator of this class having four power output coils of low amperage which continue to operate to send power to the battery at all times during engine operation, and twenty-six power output coils of high amperage which are cut off from the battery when the battery is fully charged and which cut in the battery circuit when the landing lights are on.

It is another object of this invention to provide an electrical power supply and regulation system for an aircraft that connects current output from an alternator in incremental steps to the load responsive to the current demands of that load.

It is a further object of this invention to provide an electrical power supply and regulation system wherein relays for regulation are dampened from vibration of contacts by compensating coils when the voltage across the coils of the relay is suddenly reduced or increased due to the opening and closing of the relays.

It is a further object of this invention to provide an electrical power supply and regulation system with a relay that compensates for the loss of current in coils of the relay due to heat.

It is still another object of the invention to provide an electrical supply and regulation system that is powered by an alternator having a rotor of permanent magnets and a stator of coils. The coils are divided into parallel groups. Each of the groups has a corresponding relay. The relays sequentially switch in or switch out the current induced in the coils by the magnets with components demanding current, depending on predetermined values for the opening or closing of these relays. These predetermined values are voltages across a battery that provide a datum level of rectified alternating current to components utilizing such current.

It is still a further object of the present invention to provide in combination with an electrical load and a rotating member, an electric power supply and regulation means comprising, permanent magnets adapted to be rotated by said member, coils static with respect to said rotating member and having electric current induced therein by said permanent magnets, said coils being electrically in parallel with each other and being arranged in parallel groups, means rectifying the current induced in said coils, means supplying direct potential across said rectifying means differing in response to variation in current demand of the electrical load across said rectifying means, switching members corresponding to each of said group of coils, and, each of said switching members being operable to communicate to said rectifying means current in the corresponding group of coils responsive to a different direct potential being supplied across said rectifying means.

It is still another object of the present invention to provide an electrical power supply and regulation system using an alternator which has a high electrical power output to weight ratio.

It is still another object of the present invention to provide an electrical source of power for many small airplanes in which it is impossible as a practical matter to provide such airplanes with conventional generating equipment due to the extremely restrictive space limitations within such airplane engine compartments. The alternator of the present invention may be installed in existing aircraft with very little or no alterations in the aircraft. The alternator of the present invention provides a means to permit pilots of many existing airplanes to comply with new Federal Safety Regulations which require two-way radio communication in a great many areas of the United States.

A further object of the present invention is to provide an alternator which is so designed and constructed as to be able to increase the power output of the same by three hundred percent by the installation of ceramic magnets having three times the gauss rating. The ceramic magnets have a field strength equal to an aluminum nickel magnet, but they weigh only about one-third of the weight of an aluminum nickel magnet. The ceramic magnets used in the present alternator have a field strength of about fifty times the field strength of an equivalent steel magnet. The magnets employed in the alternator are more productive than larger steel magnets. The output of the alternator of the present invention is approximately thirty amperes at a voltage of twelve volts and at a speed of two thousand revolutions per minute. It has been found that it takes less than one horsepower to operate the alternator to produce the last mentioned power output.

Other objects will appear hereinafter.

It is recognized that various modifications and changes may be made in the detail of the structure and the present drawings illustrate but the preferred embodiment.

Figure 4:
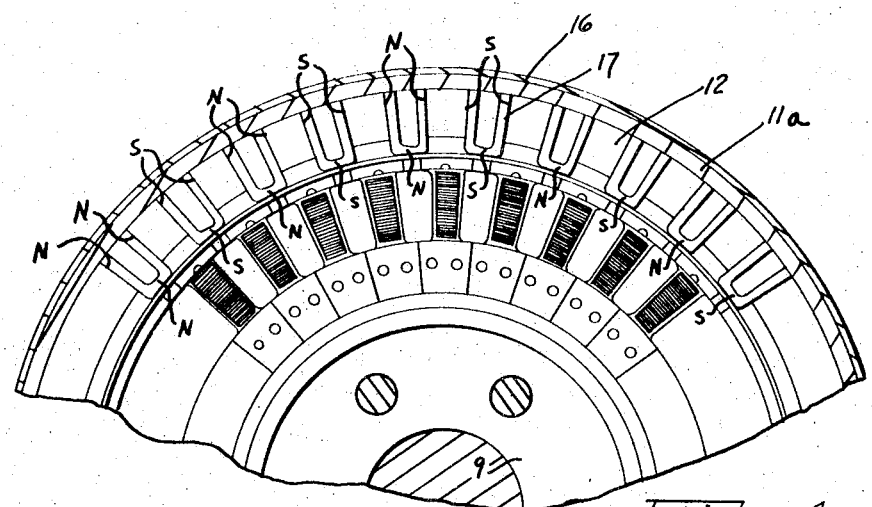
Figure 6:
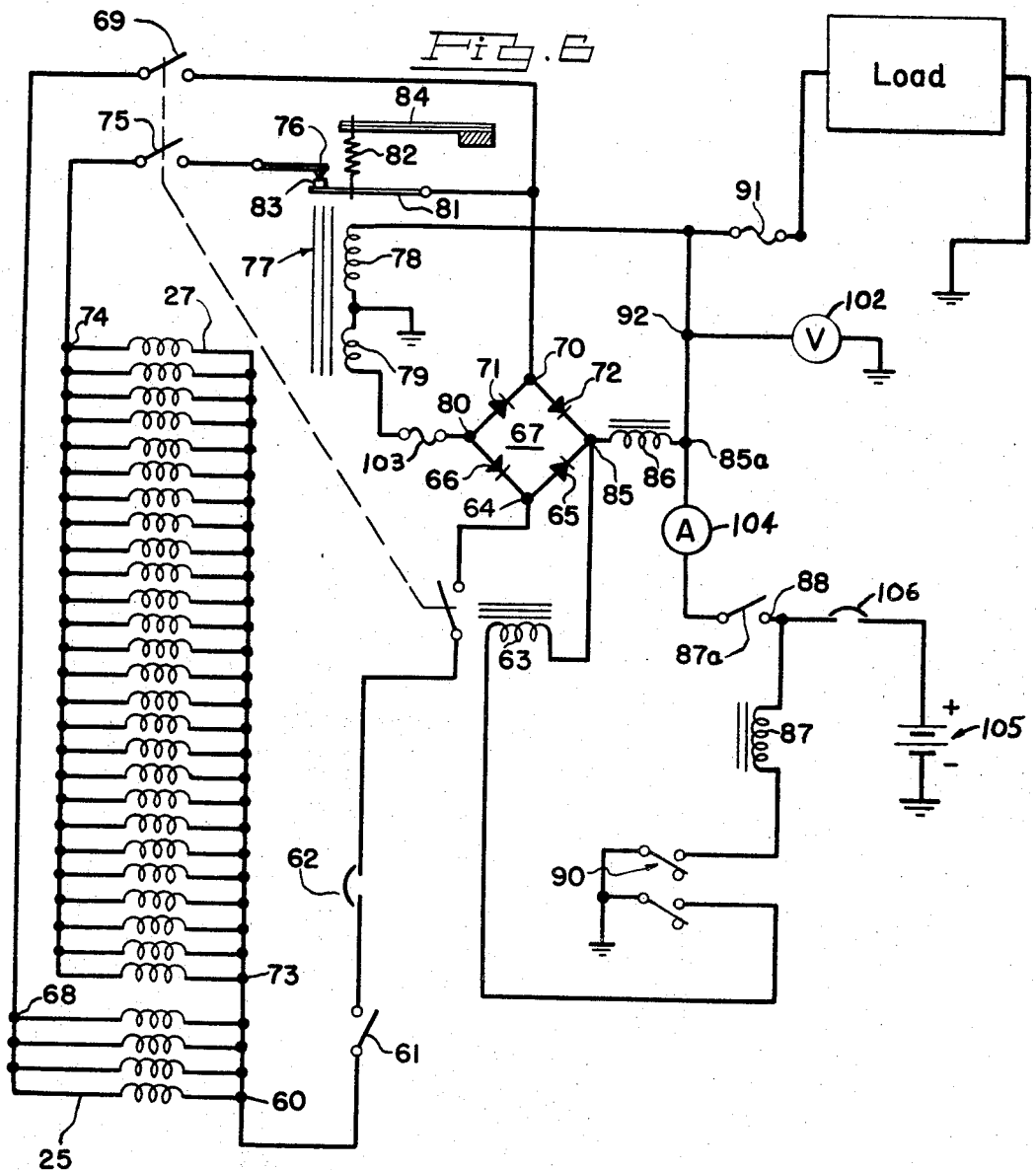
Figure 8:
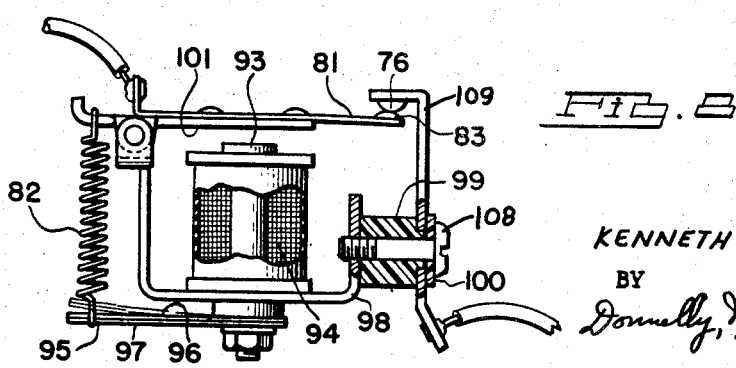

Forming a part of this application are drawings in which,

FIG. 1 is a central, vertical, sectional view of an alternator made in accordance with the invention, FIG. 2 is a plan view of the structure illustrated in FIG. 1, taken along the line 2—2 thereof, and with parts removed, FIG. 3 is an enlarged fragmentary, vertical, sectional view of the upper portion of the structure of FIG. 1, FIG. 4 is an enlarged fragmentary plan view of the upper portion of the structure of FIG. 2, FIG. 5 is a schematic diagram of a wiring system used in the invention, FIG. 6 is a schematic diagram of a wiring system used in an alternative embodiment of the invention, FIG. 7 is a schematic diagram of a wiring system used in still another embodiment of the invention, and FIG. 8 is a view partially in section of a preferred embodiment of the relays shown in the schematic diagrams of FIGS. 6 and 7.

As shown in the drawings, I have illustrated a conventional aircraft engine crankshaft 7 to which the prop blades 8 are attached by a circular crankshaft flange 9 and the bolts 10. Secured to the flange 9 by the bolts 10 is a circular plate or bracket ring 11 having the integral laterally turned ring portions 11a and 11b at the outer periphery cooperating with an end ring 13 to retain the plurality of permanent ceramic field magnets 12 and spacer pole pieces 17 in spaced apart radial positions. Each of the pole pieces has a portion 14 which projects radially inwardly so as to terminate flush with the inner side of the ring 13 and the laterally turned ring portion 11b. The rotor plate 11 is made from aluminum and is secured to the end ring 13 by the bolts 15 which project through the pole pieces 17 and threadably engage the ring 13.

Embracing the ring portion 11a is the usual spinner member 16. Between each of the permanent field magnets 12 is provided a U-shaped metal spacer 17, as shown in FIGS. 2 and 4, which is formed with the two legs thereof diverging slightly outwardly at an angle to each other. In one embodiment the pole pieces 17 were made from mild steel and 30 of them were required. The spacer pole pieces 17 are die formed and machined. In one embodiment the magnets 12 were ½" x ⅝" x 1³⁄₁₆" in size and 30 were required. The magnets 12 are magnetized through the ½" or transverse direction as opposed to the radial direction. The aforedescribed structures constitute the rotor of the magnet alternator of the present invention.

Mounted on the crankcase 18 is an engine supporting steel bracket 19 on which is mounted the attachment aluminum washer 20, the aluminum assembly ring 24, and the aluminum ring 22, by means of the bolt 21 which serves to retain the plurality of lamination stacks 23 in radially spaced apart positions. Wound around each of these lamination stacks and insulated therefrom is a copper wire coil 25, there being a total of twenty-six of these coils which are connected in parallel and four additional similar coils 27 which are connected in parallel so that the four additional coils 27 are connected to the voltage regulator coils 28 and 29, as shown in FIG. 5, and solely deliver low amperage directly to the battery 30 when the coils 25 are cut out. The lamination stacks are each made from a plurality of silicon iron wafers or plates and thirty stacks are required. The coils 25 and 27 are made from 120 turns of suitable copper wire. The last described structure comprises the stator and a clearance of about .020" exists between the rotor and stator.

The operation of the alternator of the present invention will best be understood by referring to FIG. 5. When the rotor is turning relative to the stator, the coils 25 and 27 will cut the flux fields around the stator which are created by the rotating assembly of permanent magnets and soft steel pole pieces. Alternating current will be generated in these coils. The high amperage current generated in the twenty-six coils indicated by numeral 25 passes to the battery 30 by means of the lead lines 31, 32, 33 and 37, and through the normally closed relay switch 39 and lead line 33 to rectifier 36.

The positive side of the battery 30 is connected to the rectifier 36 by means of the lead line 34, the switch 42 and the lead line 44. The negative side of the battery 30 is connected to the rectifier 36 by means of the lead line 45, the second blade of the switch 42, the lead line 46, the fuse 47 and the lead line 48.

The low amperage current from coils 27 also passes into the battery 30 through lead lines 37, 49, 32 and 33 and rectifier 36. At the same time current from coils 27 flows into the relay coil 28 through rectifier 41 and resistor 40. The voltage in the entire system when the battery 30 is only partially charged is 14 volts. As the battery 30 nears complete charge, the voltage in the entire system rises to approximately 15 volts and builds up enough electromotive force in relay coil 28 for the relay switch 39 to overcome the usual return spring tension of the relay switch 39, thereby opening switch 39. As switch 39 opens, current can flow through lead lines 31 and 50 and through rectifier 35, and the lead lines 51 and 52, to energize relay coil 29 of the normally open relay switch 38, and to close switch 38, thereby short circuiting resistor 40. It is necessary to cut out resistor 40 to maintain constant voltage in relay coil 28. When the heavy current flow from alternator coils 25 is broken by the opening of relay switch 39, voltage in the remaining part of the system, including relay coil 28 of relay switch 39, drops to 14 volts and would cause switch 39 to fluctuate were it not for the balancing effect of resistor 40. It should be further noted that relay switch 39 is placed on the alternating current side of rectifier 36, greatly reducing arcing, thereby substantially increasing the life expectancy of the contact points of relay switch 39. The only function of rectifiers 41 and 35 is to furnish direct current from the alternating current system to operate relays.

The rectifier 41 is a dry rectifier of a capacity of 250 milliamperes. The resistor 40 is an 8-ohm resistor. The relay which comprises the relay coil 28 and the switch 39 is normally closed relay and the other relay comprising the coil 29 and the switch 38 is a normally open relay. The rectifier 35 is a dry rectifier of 250 milliamperes capacity. The rectifier 36 is a dry rectifier of 35 amps capacity. The switch indicated by the numeral 42 is a master cut-out switch and it is a double pole, single throw switch. The rectifier 41, the resistor 40, the rectifier 35, and the two relays function as a voltage regulator. The battery 30 is a 12-volt battery. The symbol in FIG. 5 indicated by the numeral 43 indicates all of the other electric equipment in the plane which is supplied by the alternator system.

A permanent magnet alternator is thus provided whereby light-weight construction is provided because all of the metal parts are generally formed of aluminum. The parts attached to the crankcase are, of course, stationary and this forms the stator or stationary part of the alternator.

In FIG. 6 there is shown a first array of coils 25 of the alternator and a second array of coils 27 of the alternator. Each of the coils 25 and 27 are electrically in parallel with each other, and each of the arrays of the coils 25 and 27 are in parallel with each other. The array of coils 25 is connected at one end 60 thereof through a normally closed switch 61, a circuit breaker 62, and normally closed relay 63 to junction 64, intermediate diodes 65 and 66, of a full-wave rectifier 67.

The other end 68 of the array of coils 25 is connected through a normally closed pole switch 69 of the relay 63 to another junction 70, between diodes 71 and 72, of the full-wave rectifier 67. A common junction 73 of the array of coils 27 is in common with the end 60 of the array of coils 25. The other end 74 of the array of coils 27, being a common node on the end of each of its coils opposite to terminal 73, is connected through a normally closed armature or pole switch 75 of the relay 63 to contact 76 of the normally closed relay 77. Relay 77 is operative to connect the array of coils 27 to the aforementioned junction 70, between diodes 71 and 72, of the full-wave rectifier 67.

Relay 77 is actuated to an open condition by a magnetic field supplied by potential across coils 78 and 79. Coils 78 and 79 are connected in series to a ground disposed between the coils. Coil 78 comprises a large number of turns of fine wire. Conversely, coil 79 comprises a few turns of heavy wire. Coil 78 is connected by an electrical lead, having a length on the order of a foot, through the terminal 92 to a voltmeter 102 which in turn is connected to ground. Coil 79 is connected to a fuse breaker 103 which in turn is connected to junction 80, between diodes 66 and 71 of the full-wave rectifier 67. Armature 81 of the relay 77 is biased by a spring 82 towards the closing of contact 83 on the armature with the aforementioned contact 76. Spring 82 is attached to the free end of a bimetal strip 84.

Junction 85 of the full-wave rectifier 67 is connected by a lead, having a length on the order of a foot, to a choke 86. Choke 86 is connected at junction 85a to the aforementioned lead from coil 78 of relay 77 and to the aforementioned voltmeter 102. Choke 86 smooths the ripples on the rectified A.C. output of the full-wave rectifier 67.

An ammeter 104 is also connected to junction 85a. At an opposite terminal of the ammeter 104, a lead having a length on the order of 7 feet is connected to the armature or pole switch 87a of a normally closed relay 87. As will be further shown, the voltage is regulated where the equipment uses it rather than at the battery. The stationary contact 88 of relay 87 is connected to a circuit breaker 106 which in turn is connected to the positive side of a battery 105. The battery 105 is preferably of a potential of 12 volts and a capacity of 33 ampere hours. The negative terminal of the battery 105 is connected to ground. The coils of relays 63 and 87 are connected through a normally closed, manually actuated double pole switch 90, across terminal 85 of the full-wave rectifier 67. The coil of relay 87 is connected to stationary contact 88 of relay 87.

The electrical load of the aircraft is grounded to the negative terminal of the battery 105 and is across a fusible circuit breaker 91 and the aforementioned voltmeter 102. The circuit breaker 91 is connected to the voltmeter 102 and choke 86 at the terminal 92. Terminal 92 is in common with terminal 85a.

Referring to FIG. 7, the array of coils 27 is broken up into parallel groups 27a, 27b and 27c. Each of the groups of coils is connected through a corresponding armature or pole switch 75a, 75b and 75c of the relay 63 to contacts 76a, 76b and 76c respectively, of the normally closed relays 77a, 77b and 77c. Each of the relays 77a, 77b and 77c, is operable to connect the corresponding array of coils to terminal 70, between diodes 71 and 72, of the full-wave rectifier 67.

Each of the relays 77a, 77b and 77c is actuated to an open condition by magnetic fields supplied by potential across coils 78a and 79a, 78b and 79b, and 78c and 79c, respectively. Coils 78a and 79a are connected in series to ground therebetween. Coils 79a, 79b and 79c are connected in series to a fuse breaker 107 which in turn is connected to junction 80, between diodes 66 and 71, of the full-wave rectifier 67. Each of the coils 78a, 78b and 78c comprises a large number of turns of fine wire. Conversely, each of the coils 79a, 79b and 79c comprises a few turns of heavy wire. The coils 78a, 78b and 78c are connected in series with each other. Coil 78c is connected to junction 85, between diodes 65 and 72, of the full-wave rectifier 67. Except for the division of the array of coils 27 into parallel groups, the provision of additional relays corresponding to these groups, the serial connection of the low resistance coils of the corresponding relays, and the direct connection of the higher resistance coils between ground and terminal 85 of the full-wave rectifier 67, the circuit of FIG. 7 is similar to that shown in FIG. 6 and is marked with similar reference numerals.

Referring to FIG. 8, there is shown the preferred construction of the relays 77, 77a, 77b and 77c utilized in the circuits shown in FIGS. 6 and 7. The relay comprises a core 93 wound with suitable wire 94 to provide a magnetic field in a direction to draw armature 81 towards the core, breaking the contact between contact 83 located on an armature 81 and the stationary contact 76. The armature 81 is biased towards closing the contacts 76 and 83 by spring 82. The spring 82 is secured to the hook end of a flat soft steel plate 101 attached to the armature 81, opposite to that end of the armature carrying contact 83. The spring 82 is also hooked to the free end 95 of a bimetallic strip. The bimetallic strip comprises, in its preferred embodiment, a steel strip 96 and an aluminum strip 97. The steel having a lesser coefficient of expansion due to heat than the aluminum, the bimetallic strip will bend in the direction of the steel strip 96 when heat is applied. The bimetallic strip is anchored to the relay by means of a screw to a U-shaped piece of soft steel 98. Stationary contact 76 is anchored to the U-shaped member 98 by means of a screw 108, binding a fiber spacer 99 to the U-shaped member 98. The head of screw 108 is separated from the metal strip 109 carrying contact 76 by a fiber washer 100. The armature 81 is preferably a bronze strip in order to help carry current. It is secured, preferably by rivets, to a flat soft steel plate 101 carrying the hook end upon which the spring 82 is attached. The flat steel plate 101 is hingedly mounted in the U-shaped stationary member 98.

In the preferred embodiment of the invention, the entire relay is 3/4" wide by 1" long and the coil is 1" high. U-shaped member 98 desirably is made from soft steel which is 3/32" thick. The armature plate 81 is 1/16" thick by 3/4" long. The bimetal strip is 3/4" wide and 1½" long. Commensurate with the smallness of the relay, the entire alternator weighs about 13 pounds, as compared with the 20 pound weight of a power generator of comparable power output.

Referring to the operation of the circuit shown in FIG. 6, prior to the starting of the engine of an aircraft, the switch 90 is in its normally closed position. Consequently, relays 63 and 87 are in their normally closed position. Because relay 63 is in its normally closed position, pole 69 and pole 75 are also closed. Because relay 87 is closed, pole 87a of that relay is also closed. When the engine is started, the current necessary for starting the motor is initially drained from the battery 105. Because the relay 77 is preferably set to open at a voltage somewhat higher than the normal voltage rating of the battery (for example, 14 volts) and the initial drain on the battery 105 causes the voltage across it to be somewhat less than the critical voltage of opening, relay 77 is in a closed position immediately after starting the engine. As soon as the engine is in a running condition, because of the closed condition of the aforementioned relays and switches, all of the current output of the arrays of coils 25 and 27 passes through the full-wave rectifier 67, causing the battery 105 to recharge while running such electrical equipment as is then being utilized. When the battery 105 is sufficiently recharged to reach the critical voltage of 14 volts, relay 77 opens, breaking the current between the array of coils 27 and the full-wave rectifier 67. The critical voltage is not reached if either the battery 105 does not become sufficiently recharged or there is a greater current demand of current output than the array of coils 25 can handle alone. The output of the array of coils 25 is typically on the order of 10 amperes.

Immediately subsequent to the opening of the relay 77 due to the reaching of the critical voltage that it has been previously set for opening, because current from the array of coils 27 is cut off from the rest of the system, the voltage across the battery has the immediate transient response of reducing slightly. In order to prevent the immediate reclosing of relay 77, coil 79 has been provided in the circuit in such a manner that a slight reduction of voltage across the battery will result in a flow of current in that coil to counteract the drop of voltage across coil 78 that would tend to close relay 77. In this manner, the re-cycling of contact in the relay is dampened.

If, subsequent to the opening of relay 77, there is a greater current demand from the equipment of the airplane than that supplied by the array of coils 25, the voltage across the battery will drop below the critical voltage for the opening of relay 77, causing that relay to close. If the additional demand is in a steady state, the relay 77 will close, and the current from array of coils 27 will be re-supplied to the full-wave rectifier 67, meeting the additional current demand without further drain of current from the battery.

It can be seen from the operation of the circuit just described, that once the engine has been started, the battery provides a datum level on which the ripple effect from the rectified A.C. current from the alternator is reduced as seen from the load. In this manner, a smaller battery is required than otherwise would be necessary because electrical energy demands are met by the alternator almost exclusively.

Referring to FIG. 7, the circuit shown operates similarly to that shown in FIG. 6 except that the array of coils 27 is broken up into three parallel groups and each supplies or is removed from supplying electrical energy to the system at correspondingly different voltages across the battery. As in the circuit shown in FIG. 6, the normally closed relays 63, and 87, which are controlled by the normally closed manual switch 90 are in a closed position throughout operation of the aircraft. The essential reason for their existence is one of safety for complete open circuiting of electrical regulation and supply in case of fire or some similar emergency. The switches and relays of the armatures and poles upon which they depend, are normally closed, as are the relays 77a, 77b and 77c immediately subsequent to the starting of the engine. The energy for starting the engine is obtained exclusively from the battery. Subsequent to the starting of the engine, the entire output of the alternator is supplied to the sysem through the rectifier 67. Each of the groups of coils 27a, 27b and 27c are cut out of supplying current to the system when its corresponding relay 77a, 77b and 77c is opened upon the voltage across the battery reaching a predetermined value. Each of the relays 77a, 77b and 77c opens at a different predetermined voltage across the battery. In a preferred practice of the invention, relay 77a will open at 13½ volts, 77b will open at 14 volts and 77c will open at 14½ volts.

When the battery is recharging after the initial starting of the engine, and reaches the value of 13½ volts, relay 77a opens, thereby removing the current output of the array or set of coils 27a from supply to the circuit. This causes a transient drop in voltage across the battery, but because of the dampening effect of current passing through coil 79a, the contacts of relay 77a are prevented from cycling back to a closed position, or at least dampened from doing so if cycling does initiate. In a similar manner, relays 77b and 77c are opened when the voltage reaches the aforementioned critical value corresponding to the opening of these relays. In a manner similar to that discussed with reference to the circuit shown in FIG. 6, each of the aforementioned relays is closed when voltage is reduced from the critical voltage for their opening.

Referring to the view of a typical relay 77 used in the circuit shown in FIG. 6, or relay 77a, 77b or 77c in FIG. 7, the opening of this normally closed relay is caused by a sufficient magnetic field developing in the core 93 to draw the armature into breaking the contacts 76 and 83. Because this magnetic field is dependent upon the current flowing in the wires 94 wound around the core 93, and this current is in turn dependent upon the voltage across the coil, in calibrating the opening of the relay to a predetermined voltage across the coil it is important to compensate for the variance of electrical resistance of the coil due to heat.

As the voltage across the coil approaches the critical voltage for the opening of the relay, current flowing through the coil heats up the coil and increases the resistance in the coil to the passage of more current. This effect prevents a sufficient magnetic field developing in the core to open the relay at the predetermined value because an insufficient amount of current passes through the coil at that point to develop such a magnetic field. The bimetallic strip operates to compensate for this by reducing the tension in the spring 82 providing the force against which the magnetic field must act. As the coil heats up, some of the heat is conducted by members mounting the bimetallic strip to the relay, causing the bimetallic strip to heat up and bend. As the free end of the bimetallic strip bends, the tension in the spring is reduced, and therefore the magnetic field required to open the relay is correspondingly reduced. The movement of the bimetallic strip is on the order of 1/100th of an inch, but since, in the preferred embodiment of the invention, the movement of the armature is ony two or three times that amount, the movement of the bimetallic strip is such as to sufficiently reduce the tension of the spring so that the reduction in electrical conduction of the coil is compensated for, and the relay opens at the predetermined voltage across the coil. In this manner a more precise calibration of the opening of the relay to a predetermined voltage can be achieved.

From the foregoing description it can be readily appreciated that an electrical power supply and regulation system has been provided whereby incremental steps of current are supplied to electrical components at precisely determined levels and in conformity with the current demands of such components. Further, such a system can be utilized with a battery in such a manner that the battery provides essentially a datum level for the reduction of the ripple effect of rectified A.C. voltage to components requiring effective D.C. energy supply, without destructive charging or discharging of the battery. This system accomplishes the above objectives with a minimum amount of parts, without parts that move in relation to one another in such a manner as to cause wear, and it is safe to use and economical to manufacture.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a regulated power supply system, the combination of an electrical load; a rotating member including a rotor comprising a ring carrying a plurality of radially spaced apart permanent magnets; a stator including a plurality of radially spaced apart lamination stacks static with respect to said rotating member, each of said stacks having a wire coil wound therearound and having electric current induced therein by said permanent magnets; said coils being electrically in parallel with each other and being arranged in two parallel groups; a first means rectifying the current induced in said coils; one group of said two groups of coils being connected directly across said rectifying means; a battery supplying direct potential across said first rectifying means differing in response to variation in current demand of the electrical load across said first rectifying means; the other of said two groups of coils being connected across said first rectifying means by a normally closed relay switch means responsive to a different direct potential being supplied across said first rectifying means; said normally closed relay switch means including a relay coil energized by electrical current supplied from said one group of coils through a second rectifying means and a resistor; and, a shunting circuit means for said resistor to cause said normally closed relay switch means to open when said battery is fully charged and disconnect said other group of coils from said first rectifying means.

2. In a regulated power supply system, the combination as defined in claim 1, wherein: a pole piece is mounted between each of said permanent magnets.

3. In a regulated power supply system, the combination as defined in claim 1 wherein: said rotor is disposed around the periphery of said stator.

4. In a regulated power supply system, the combination as defined in claim 1, wherein: a pole piece is mounted between each of said permanent magnets; said rotor is disposed around the periphery of said stator; and, said shunting circuit means includes a normally open relay switch means which is provided with a relay coil energized by electrical current supplied by said two groups of coils through a third rectifying means.

5. In a regulated power supply system, the combination of an electrical load; a rotating member; a plurality of permanent magnets adapted to be rotated by said rotating member; a plurality of coils static with respect to said rotating member having electric current induced therein by said permanent magnets; said coils being electrically in parallel with each other and being arranged in parallel groups; means rectifying the current induced in said coils; one group of said groups of coils being connected directly across said rectifying means; a battery supplying direct potential across said rectifying means differing in response to variation in current demand of the electrical load across said rectifying means; switching members corresponding to each of the remainder of said groups of coils; each of said switching members being operable to said rectifying means current in the corresponding group of said remainder of said groups of coils responsive to a different direct potential being supplied across said rectifying means; each of said switching members comprising a normally closed relay; said relay comprising two coils supplying a magnetic field; said last mentioned two coils being connected together at the negative terminal of said direct potential supplying battery; one of said last mentioned two coils having more turns and greater resistance than the other of said last mentioned two coils; the greater resistance coil being in parallel with said direct potential supplying battery; current in said one coil being operable to dampen a change in the magnetic field induced by said last mentioned two coils due to a change in voltage across said last mentioned two coils; and, said relay being operable to open responsive to a change in magnetic field due to an increase in voltage in said last mentioned two coils.

6. In a regulated power supply system, the combination as defined in claim 5, wherein: said relay comprises an armature carrying a contact; means yieldably biasing a member on said armature toward closing said contact with a stationary contact; a bimetal strip having a stationary end and an end to which said biasing means is attached; means conducting heat in said last mentioned two coils to said bimetal strip; and, said bimetal strip releasing tension in said biasing means responsive to heat being applied thereto.

References Cited

UNITED STATES PATENTS

| | | | |
|---|---|---|---|
| 2,285,620 | 6/1942 | Sears | 320—24 |
| 2,611,808 | 9/1952 | Lawrence et al. | 317—152 |
| 3,105,932 | 10/1963 | Burson | 322—90 |
| 3,129,371 | 4/1964 | Bourguignon | 317—151 X |
| 3,217,228 | 11/1965 | Jardine | 320—22 X |

FOREIGN PATENTS 759,885　10/1956　Great Britain.

LEE T. HIX, *Primary Examiner.*

S. WEINBERG, *Assistant Examiner.*